Feb. 21, 1956    F. R. McFARLAND    2,735,310
ANTIRATTLING PLANETARY GEARING
Filed Sept. 25, 1951    2 Sheets-Sheet 2
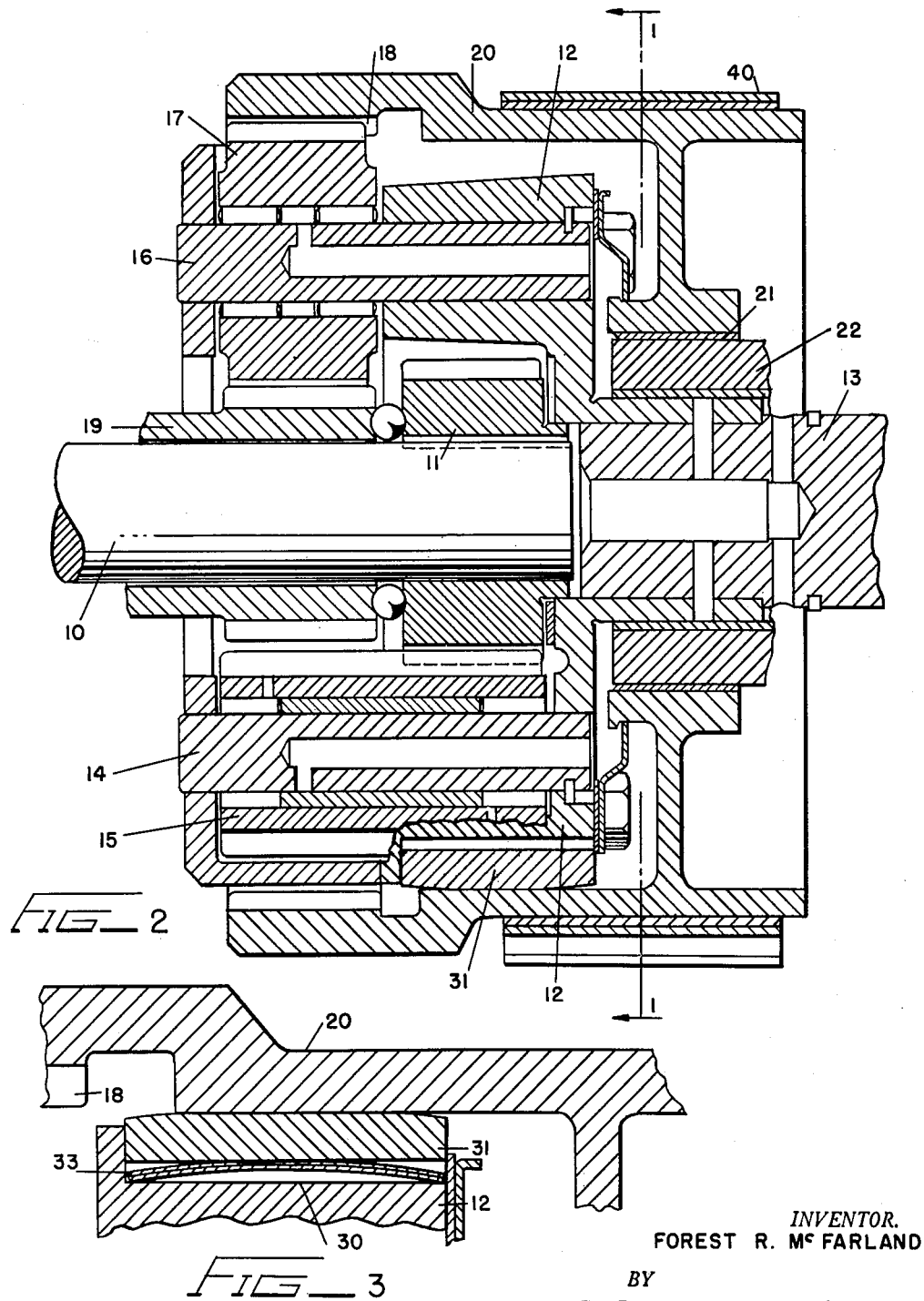
FIG_2
FIG_3
INVENTOR.
FOREST R. McFARLAND
BY
Tibbetts & Wilson
ATTORNEYS

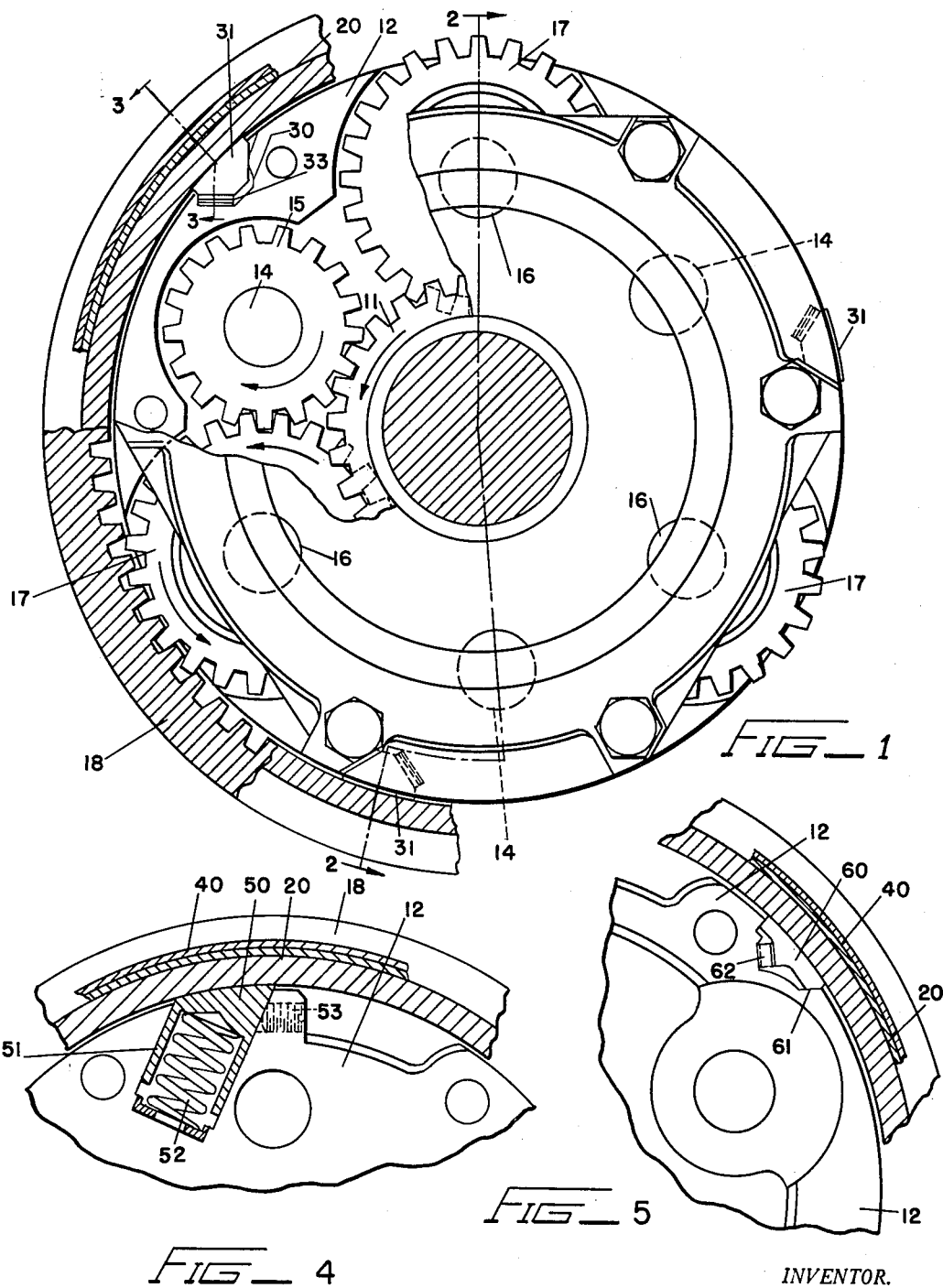

United States Patent Office 2,735,310
Patented Feb. 21, 1956

2,735,310
ANTIRATTLING PLANETARY GEARING

Forest R. McFarland, Huntington Woods, Mich., assignor to Studebaker-Packard Corporation, a corporation of Michigan Application September 25, 1951, Serial No. 248,137

8 Claims. (Cl. 74—409)

This invention relates to a planetary gearing means and more particularly to a means for dampening out the vibratory effects that are sometimes encountered because of the unavoidable presence of some degree of backlash between certain elements of commercial types of such gearing.

In many installations where planetary gearing means are used, a pulsating driving force is provided, and this is typical for example in connection with gearing of this type as may be built into the automatic transmission mechanism of an automobile. Following good commercial design practices, certain tolerances are allowed during the manufacture and assembly operations, and it happens only very rarely that the tolerances balance each other out and, therefore, some play is always encountered for example as between the teeth of the ring gear and pinion gears of any such conventional commercial type gear.

When a pulsating source of power is used there is a possibility that at certain frequencies of pulsation, the play permitted between the ring gear and other gear teeth, may cause a vibratory effect to be present which arises because of this play between the teeth of the several meshing gears. This is sometimes noticeable in an automotive transmission when the ring gear and pinion gear trains are under a very light load and is produced when the ring gear tends to overrun and then slow down with respect to the locked pinion gears upon which it is supported when the gearing is set for direct drive. It is the purpose of this invention to provide a means for dampening the effects of this source of vibration and the distress inherent in such relative movement between the parts in a planetary gear train means.

To accomplish this object in the planetary gear means construction by which this invention is exemplified, there is provided a ring gear means that may be built into or formed integral with a rotatable housing for the complete gear train. The ring gear itself is preferably formed on the inside of the housing and the carrier for supporting the planetary pinion gear train is adapted to be mounted to rotate substantially concentrically within the ring gear and housing while at the same time holding the pinion gear trains fixed thereto in a manner to properly cooperate with either the ring gear or sun gear means.

Unwanted vibratory effects which heretofore have been occasioned by the above described relative motion between the outer pinion gears mounted on the planetary carrier and the ring gear, are dampened in accordance with the preferred form of this invention, by introducing a coacting means between the carrier and ring gear housing that is operative to permit the ring gear to have relatively free rotation in one direction with respect to the carrier, but which is operative to instantaneously present a substantial resistance to any relative rotation in a backward direction. The coacting means functions to frictionally engage the two elements together and in this manner such vibratory effects as the rattle and the distress caused by the peening action on the surfaces are substantially dampened so that their presence may be substantially eliminated. The firm and sure control of the relative motion between the carrier and the ring gear housing serves to dampen out any tendency for the ring gear teeth to vibrate against the teeth of the meshing pinion gears.

A preferred form of accomplishing this invention is shown in the drawings but it is to be understood that the invention is not intended to be limited in its application to the details of construction and arrangement of parts here shown, since the invention is capable of embodiment in various forms. Also, it is intended that the phraseology here used, is for the purpose of description only and not by way of limitation.

In the drawings:

Figure 1 is a rear end view partly broken away showing a planetary gear carrier and a cooperating ring gear having the present invention embodied therein and taken on line 1—1 of Figure 2;

Figure 2 is a sectional side elevation of one form of the planetary gear train construction taken on line 2—2 of Figure 1;

Figure 3 is a sectional view of the friction shoe which coacts between the planetary gear carrier and the ring gear housing, the view being taken on line 3—3 of Figure 2;

Figure 4 is a sectional end elevation of a modified form of the friction shoe means; and Figure 5 is an end view of still another form of friction shoe means.

One example of a useful application of a planetary gear means such as is disclosed herein, will be found in my copending application, Serial Number 71,128 filed January 15, 1949, for Transmissions.

As shown in that application, such a gear means is adapted for use in an automatic transmission for automobiles and power is supplied to the transmission from the engine of the car. For this purpose, the gear train disclosed herein makes use of a drive shaft 10 suitably connected to the engine, the shaft 10 having a driving sun gear 11 keyed to the end thereof. The sun gear 11 is centrally disposed with respect to the planetary carrier 12 which is mounted to rotate around the sun gear and the carrier serves to transmit power from the sun gear on the drive shaft through the pinion gear trains supported on the carrier to the driven shaft 13 to which the carrier is fixed.

In order to support the several identical pinion gear trains, the carrier 12 is provided with a plurality of stub shafts 14 and 16 each of which forms a bearing for the inner elongated pinion gears 15 and the outer pinion gears 17 respectively that are rotatably carried thereon. The shafts 14 and 16 are positioned to rotatably support the pinions 15 and 17 in meshing relation, and to also hold gears 15 in position to mesh with the driving sun gear 11. The pinion 17 meshes with the surrounding ring gear 18 at one point on its periphery and at a diametrically opposite point it meshes with the controlling sun gear 19.

The ring gear 18 that meshes with the pinions 17 is preferably formed within the rotatably mounted housing 20 which is carried on bearings 21 carried on a fixed part of the transmission housing only a portion 22 of which is shown in the drawings, the bearing 21 and housing 20 being thus mounted so as to be concentric with the common axis about which the driving and driven shafts 10 and 13 rotate. The control sun gear 19 which also meshes with the pinions 17, is mounted in a manner to be coaxially disposed with respect to the drive shaft 10 but is centered and preferably is supported entirely by means of its contact with the three pinions 17.

The sun gear 19 is freely rotatable with respect to shaft 10 and the independent movement of sun gear 19 is adapted to be controlled to accomplish various purposes as is more fully disclosed in the above mentioned copending application.

The carrier 12, at spaced points around its periphery, is provided with axially disposed channels 30 which are best seen in Figures 1 and 3, the channels being configured to receive brake shoes 31 each of which is of generally triangular shape in cross section. The shoes are mounted in their respective channels so that the base portion of each one of the triangular shoes, referring particularly to Figure 1, is adapted to ride in contact with the inner wall of the housing 20 integral with the ring gear means, and the other walls of each one of the triangular shaped shoes are adapted to be engaged, one against the sloping wall of the respective channels 30, and the other by spring 33 disposed between the other wall of the respective channels and the brake shoe.

For the purpose only of illustrating the functioning of the friction shoes, and referring to Figure 1, it is apparent that when the carrier 12 remains relatively stationary, and the housing 20 rotates in a counter-clockwise direction relative thereto, each of the brake shoes 31 is pushed back against its respective spring 33 so that the housing 20 can pass relatively freely by the carrier as the parts move.

On the other hand, again assuming that the carrier 12 remains relatively stationary as shown in Figure 1, and that the housing 20 tends to rotate clockwise relative thereto, the respective brake shoes 31 under the urging of their separate springs 33 and also because of their frictional engagement with the inside of housing 20, would all tend to immediately wedge firmly between the inside of housing 20 and the upwardly sloping wall portions of the respective channels 30 to instantaneously present a substantial resistance to the possibility of relative motion in this direction.

The braking action of the several shoes 31 as described above substantially eliminates the possibility of any unwanted relative motion as between the carrier 12 and the ring gear or housing 20 and the pinion gears 17 which, under the conditions prevailing when the gearing is set for direct drive, finds the pinions 17 locked. As is obvious, when pinions 17 are thus locked, the housing and ring gear 18 ride freely therewith and the action of the shoes 31 against the housing 20, permits the housing to move forward with a ratcheting action so that vibration is eliminated. The application of the braking force produced by shoes 31 at spaced points around the periphery of the carrier and within the housing, provides a sufficiently positive control of these relative motions so that all tendency to rattle and any distress normally incident thereto are eliminated.

The operation of the planetary gear train described above is fully disclosed in my mentioned application. Briefly, however, the gear train receives its motion from the drive shaft 10 through the sun gear 11. The sun gear 11 meshes with each of the elongated pinion gears 15 which in turn deliver their power to the pinion gears 17. For forward motions in an automotive transmission, the control sun gear 19 may be held stationary and the reaction between the stationary sun gear 19 and the driven pinions 17, causes the carrier 12 to rotate so that the shaft 13 is driven. When a direct drive from shaft 10 to shaft 13 is desired, the control sun gear 19 is locked so as to rotate with the drive shaft 10 and thus, the gear train is locked because of the different diameters of sun gears 11 and 19 and the cooperating pinion gears 15 and 17. With the gear system thus locked, the several pinion trains cannot rotate since all of these gears intermesh and, therefore, the control gear 19 together with sun gear 11 drive the carrier 12 in such a manner that the driven shaft 13 is coupled directly to the rotation of drive shaft 10.

The arrangement here disclosed is also used for producing a reverse direction in the driven shaft 13, and in order to accomplish this, the control sun gear 19 is allowed to run freely on drive shaft 10. The brake 40 which engages around the outside of housing 20 is then actuated to hold the ring gear 18 stationary and when these conditions prevail, the reaction produced between each of the pinions 17 and the stationary ring gear 18, causes the carrier 12 to rotate in a reverse direction so that shaft 13, to which it is keyed, also rotates reversely.

Referring to Figures 4 and 5, modified forms of brake shoes are shown and either of these forms of the invention are equally as effective in dampening out rattle as is the preferred form of the shoes which is shown in Figures 1, 2, and 3.

In Figure 4, a shoe 50 is disclosed which fits into a round hole 51 that is bored in a slantwise direction into the carrier 12, with respect to a radial line inwardly from the periphery thereof. The brake shoes 50 are each adapted to be slidably mounted within their respective holes 51 and a coil spring 52 is trapped within each of the respective bodies of shoes 50 to press against the bottom of holes 51 so that the brake shoes are each urged outwardly to engage against the inside surface of housing 20. Any desired number of shoes 50 may be spaced around the periphery of carrier 12 but in practice, three have been found to be sufficient.

In the form of the invention shown in Figure 4, a temporary holding screw 53 may be provided to cooperate with each shoe as it is disposed in its respective hole 51 for holding the shoe 50 in a fixed position so that it can be ground down to conform exactly to the periphery of carrier 12 and to provide a more sure locking action. After the surfaces of all the brake shoes have been finished to the periphery of carrier 12 they closely fit the wall of housing 20 and when the finishing has been completed, the locking screw 53 may be removed so that the shoes 50 will be free to slide in holes 51 whereby to interengage the housing with respect to carrier 12 with a ratcheting effect during normal operation of the planetary gear train to accomplish all of the objects desired.

Referring to Figure 5, another modified form of brake shoe means is disclosed wherein each shoe has a relatively flat shape as disclosed in the end view in Figure 5. Each brake shoe 60 is adapted to cooperate with the cam surface 61 formed in its associated slot provided in the periphery of carrier 12 and a flat spring means 62 may be provided for urging the brake shoe 60 into contact with the inside surface of housing 20.

The normal operation of the brake shoes 50 and 60 is similar to the action of shoes 31 and they are equally as effective in dampening out all tendency of portions of a planetary gear train, such as is here shown, to rattle. The preferred form of the brake shoe is shown in Figures 1, 2 and 3, however, because this structure may be manufactured and assembled somewhat more easily than the modified forms of brake shoes shown in Figures 4 and 5.

It is probable that various forms of the invention other than these described herein may occur to those skilled in the art which will fall within the scope of the following claims.

I claim:

1. A means for dampening the effects of vibration produced by backlash or the like in a planetary gearing means comprising a driving shaft and a driven shaft, a sun gear, a planetary disc shaped carrier member for supporting a pinion gear train having inner and outer gears, and a ring gear meshing with the outer pinion gear of said train, said sun gear and said carrier each being fixed respectively to one of said shafts, said ring gear having an integral cylindrical collar member generally concentrically arranged with respect to and surrounding at least a portion of said carrier, said carrier being mounted to rotate within said collar, and a plurality of one-way friction shoe means, said carrier having a plurality of slantingly disposed slots formed therein, said shoes being slidingly mounted in said slots, springs trapped between the floor of said slots and said shoes to urge them outwardly, said shoes having an outer surface formed to the radius of the periphery of said disc shaped carrier, and the outer surfaces of said shoes being adapted to engage against the inside surface of said collar to permit relative movement between said members to take place more easily in one direction than in the other.

2. A means for dampening the effects of vibration produced by backlash or the like in a planetary gearing means comprising a driving shaft and a driven shaft, a sun gear, a planetary carrier member for supporting a pinion gear train having inner and outer gears, and a ring gear meshing with the outer pinion gear of said train, said sun gear and said carrier each being fixed respectively to one of said shafts, said ring gear having an integral cylindrical collar member generally concentrically arranged with respect to and surrounding at least a portion of said carrier, said carrier being mounted to rotate within said collar, and a plurality of one-way friction shoe means, said shoe means each taking the form of a sliding element having a generally elongated bearing surface, said carrier having a plurality of correspondingly elongated and axially disposed slots formed therein, said slots each having a sloping cam surface at one end thereof, said shoes each having a seat on its underside, resilient means adapted to be positioned between each of said seats and the bottom of said respective slots when said shoes are mounted therein, the working faces of said seats being generally disposed at about right angles to the plane of said cam surfaces so that said springs tend to urge the shoes outwardly along said cams to force the shoes into the bight formed between said cams and the inside surface of said collar whereby to permit relative movement between said members to take place more easily in one direction than in the other.

3. In the planetary gear system having a carrier member rotatably supporting meshing inner and outer pinion gears, and a ring gear meshing with the outer pinion gears, a device for dampening the effects of vibration produced by backlash, or the like, when the gears are driven, comprising a cylindrical collar member connected with the ring gear and disposed generally concentrically about said carrier member, friction means adapted to coact against said collar to permit relative movement between the carrier and collar more easily in one direction than a relative movement in the opposite direction; said friction means being resiliently urged towards a coacting position.

4. In the planetary gear system having a carrier member rotatably supporting meshing inner and outer pinion gears, and a ring gear meshing with the outer pinion gears, a device for dampening the effects of vibration produced by backlash, or the like, when the gears are driven, comprising a collar member connecting with the ring gear and disposed generally concentrically about at least a portion of said carrier member, friction means mounted on said carrier member and adapted to coact against the inside of said collar, whereby the carrier and collar may rotate relative to each other more freely in one direction than in the opposite direction; said friction means always being resiliently urged towards a coacting position.

5. In a planetary gear system having a rotatably mounted driven shaft with a carrier member connected thereto for rotatably supporting meshing inner and outer pinion gears, and a ring gear meshing with the outer pinion gears, a device for dampening the effects of vibration produced by backlash, or the like, when the gears are driven, comprising a cylindrical collar member connecting with the ring gear and its inner side disposed generally concentrically about at least a portion of said carrier member, said carrier member being mounted to rotate with said driven shaft, within said collar, and friction means resiliently mounted on said carrier member to coact at all times against said collar, whereby the carrier and collar may rotate relative to each other more freely in one direction than in the other direction.

6. In a planetary gear system having a rotatably mounted driven shaft with a carrier member connected thereto for rotatably supporting meshing inner and outer pinion gears, and a ring gear meshing with the outer pinion gears, a device for dampening the effects of vibration produced by backlash, or the like, when the gears are driven, comprising a cylindrical collar member connecting and with the ring gear, with its inner side disposed generally concentrically about at least a portion of said carrier member, said carrier member being mounted to rotate with said driven shaft, within said collar, and resiliently biased friction shoe means carried by one of said members to bear against the other member at all times, whereby said carrier and collar members may be rotated relative to each other more easily in one direction than in the other direction.

7. In a planetary gear system having a rotatably mounted driven shaft with a pinion carrier member connected thereto for rotatably supporting meshing inner and outer pinion gears, and a ring gear meshing with the outer pinion gears, a device for dampening the effects of vibration produced by backlash, or the like, when the gears are driven, comprising a cylindrical collar member connecting with the ring gear, with its inner surface disposed generally concentrically about at least a portion of said carrier member, said carrier being mounted to rotate with said driven shaft, within said collar, a plurality of friction shoe means each being mounted in channels formed axially in the periphery of said carrier member, resilient means adapted to continuously urge said shoes against the inner surface of said collar, said channels each having a sloping cam surface at one side thereof to co-operate with its respective shoe, and said resilient means urging each of the shoes into the respective bights formed between the sloping cams and said collar inner surface, whereby said carrier and collar members may be rotated relative to each other more freely in one direction than in the opposite direction.

8. In a planetary gear system having a rotatably mounted driven shaft with a carrier member connected thereto for rotatably supporting meshing inner and outer pinion gears, and a ring gear meshing with the outer pinion gears, a device for dampening the effects of vibration produced by backlash, or the like, when the gears are driven, comprising a cylindrical collar member connecting with the ring gear, with at least a portion of its inner surface disposed generally concentrically, about said carrier member, a plurality of friction shoe means and having a generally triangular cross section, said shoes being adapted to be mounted respectively in axially disposed channels communicating with the periphery of said carrier member, resilient means to continuously urge each of said shoes against the inner surface of said collar, said channels each having a sloping cam surface formed at one side thereof to co-operate with its respective shoe, and said resilient means urging each of the shoes into the respective bights formed between the sloping cam surfaces and the inner surface of the collar member, whereby said collar and carrier members may be rotated relative to each other more freely in one direction than in the opposite direction.

References Cited in the file of this patent

UNITED STATES PATENTS

| | | |
|---|---|---|
| 2,459,793 | Churchill | Jan. 25, 1949 |
| 2,546,378 | Winther | Mar. 27, 1951 |
| 2,570,327 | Dodge | Oct. 9, 1951 |
| 2,670,828 | McFarland | Mar. 2, 1954 |

FOREIGN PATENTS

| | | |
|---|---|---|
| 456,007 | Great Britain | Nov. 2, 1936 |